United States Patent
Taggart et al.

(10) Patent No.: US 7,200,581 B2
(45) Date of Patent: Apr. 3, 2007

(54) MODULAR INSTRUCTION USING COGNITIVE CONSTRUCTS

(75) Inventors: David Michael Taggart, Monterey, CA (US); Gregory D. Baker, Carmel, CA (US); Richard Douglas Dobbs, Watsonville, CA (US); Richard J. Patz, Aptos, CA (US)

(73) Assignee: The McGraw-Hill Companies, Inc., New York, NY (US)

( * ) Notice: Subject to any disclaimer, the term of this patent is extended or adjusted under 35 U.S.C. 154(b) by 0 days.

(21) Appl. No.: 11/350,932

(22) Filed: Feb. 10, 2006

(65) Prior Publication Data

US 2006/0184486 A1  Aug. 17, 2006

Related U.S. Application Data

(63) Continuation of application No. 09/972,849, filed on Oct. 10, 2001, now Pat. No. 6,999,954.

(51) Int. Cl.
*G06F 17/00* (2006.01)
*G06N 5/02* (2006.01)

(52) U.S. Cl. .............................. 706/46; 706/14; 706/12

(58) Field of Classification Search .................. 706/46, 706/14, 12; 434/362
See application file for complete search history.

(56) References Cited

U.S. PATENT DOCUMENTS

| | | | |
|---|---|---|---|
| 5,395,243 A * | 3/1995 | Lubin et al. ................ | 434/118 |
| 5,421,730 A | 6/1995 | Lasker, III et al. | |
| 5,904,485 A | 5/1999 | Siefert | |
| 5,934,909 A | 8/1999 | Ho et al. | |
| 5,934,910 A | 8/1999 | Ho et al. | |
| 5,967,793 A * | 10/1999 | Ho et al. ..................... | 434/362 |
| 6,039,575 A | 3/2000 | L'Allier et al. | |
| 6,064,856 A | 5/2000 | Lee et al. | |
| 6,118,973 A * | 9/2000 | Ho et al. ..................... | 434/362 |
| 6,146,148 A * | 11/2000 | Stuppy ........................ | 434/322 |
| 6,186,794 B1 | 2/2001 | Brown et al. | |
| 6,606,480 B1* | 8/2003 | L'Allier et al. ............. | 434/362 |

(Continued)

OTHER PUBLICATIONS

Anil K. Jain et al, Artificial Neural Networks: A Tutorial, Mar. 1996, IEEE, 31-44.*

(Continued)

*Primary Examiner*—Joseph P Hirl
(74) *Attorney, Agent, or Firm*—Rothwell, Figg, Ernst & Manbeck, PC

(57) ABSTRACT

In a method and computer-implemented system of modular instruction a body of knowledge is divided into cognitive constructs, with instructional materials and post-instruction assessments being associated with each of the cognitive constructs and comprising a learning packet. The instructional material associated with each learning packet is presented to a student, followed by the post-instruction assessment associated with each learning packet. A result of the post-instruction assessment is compared to a pre-defined standard for that learning packet to determine whether the instructional material associated with another learning packet should be presented to the student, or if the instructional material associated with the current learning packet should be presented again to the student. The learning packets can be presented in default sequence or they can be reordered and presented in a user-selected sequence, and all or only a portion of the learning packets can be presented to the student.

20 Claims, 13 Drawing Sheets

U.S. PATENT DOCUMENTS

| | | |
|---|---|---|
| 6,622,003 B1 * | 9/2003 | Denious et al. ............. 434/350 |
| 6,652,287 B1 * | 11/2003 | Strub et al. ................. 434/365 |
| 6,996,366 B2 | 2/2006 | L'Allier et al. |
| 7,018,737 B2 | 3/2006 | Perkins et al. |
| 2002/0004191 A1 | 1/2002 | Tice et al. |
| 2003/0118978 A1 | 6/2003 | L'Allier et al. |
| 2003/0129575 A1 | 7/2003 | L'Allier et al. |
| 2004/0076941 A1 | 4/2004 | Cunningham et al. |
| 2006/0188862 A1 | 8/2006 | Johnson |

OTHER PUBLICATIONS

Nicola Henze, et al.; Student Modeling in an Active Learning Environment using Bayesian Networks; pp. 1-10; Jun. 20-24, 1999; User Modeling: Proceedings of the Seventh International Conference, UM99, Banff, Canada.

Anil K. Jain, Artificial Neural Networks: A Tutorial, 1996, IEEE, 0018-9162/96, pp. 31-44.

* cited by examiner

100

110 DIVIDE 111 INTO N COGNITIVE CONSTRUCTS 112

120 MAP 121 TO 112

130 MAP 131 TO 112

140 PROVIDE 141 TO 142

150 ASSIGN SEQUENCE j TO 141

155 SET SEQUENCE j = 1

160 PRESENT 121-j TO 161

170 GIVE 131-j TO 161

175 162-j >= 181-j ?

← NO ← ↓ → YES 180 j=k ? → YES → END

MODULAR INSTRUCTION USING COGNITIVE CONSTRUCTS

This application is a continuation of Ser. No. 09/972,849 filed Oct. 10, 2001, now U.S. Pat. No. 6,999,954. The disclosure of the prior application is hereby incorporated by reference herein in its entirety.

BACKGROUND OF THE INVENTION

1. Field of the Invention

The present invention relates generally to methods of instruction, and especially to automated, modular methods of instruction.

2. Background and Related Art

Behaviors that demonstrate learning in a domain of knowledge may be organized into discrete units, and activities designed to instruct and/or assess learning at this level of organization may be created. The component skills demonstrated by these discrete units of behavior are referred to herein as "cognitive constructs." Subtracting $3\frac{9}{16}$ from $7\frac{3}{8}$, for example, involves at least four cognitive constructs: subtracting integers, manipulating fractions, equalizing denominators, and carrying numbers. Behaviors that demonstrate mastery of these cognitive constructs may be elicited in assessments of those constructs, and instructional activities intended to teach these constructs may also be created. States, localities, or school districts typically articulate or adopt expectations ("standards") regarding what students should know and be able to do at various points in their development. Instructional materials generally teach subjects involving the same cognitive constructs to students. They differ, however, in the organization of those constructs into larger units (e.g., instructional units, chapters), and in the order in which those subjects and their constituent skills are taught and assessed. Learning in different states, localities, or school districts varies therefore not so much in content itself, but in the organization and sequencing of the content. The organization employed by known methods of instruction, however, is not easily modifiable. As a result, the sequence of instruction and the assessment of student skills may not be compatible with the organization of expectations articulated in the standards. A state, locality, or school district that wishes to modify a prescribed order of presentation must resort to skipping around in the prescribed order of presentation. There exists a need for a universal product which is adaptable to various states', localities', or school districts' standards and preferred orders of presentation of core instructional material, and in which the organization and order of presentation is freely modifiable at the option of the state, locality, or school district.

The present invention addresses this need by providing a modular teaching method wherein cognitive constructs are presented in modular learning packets along with assessments and instructional materials such that the order in which the learning packets are presented is freely modifiable at the option of an administrator. The scope of each modular learning packet is preferably organized according to the language of standards, that is, language explaining what students should know and be able to do. The modular teaching method and system according to the present invention is preferably implemented over a computer network allowing the learning packets to be presented to students in an electronic format via computer workstations. While computerized training systems are known, as exemplified by U.S. Pat. No. 5,904,485 to Siefert, U.S. Pat. No. 5,934,909 to Ho et al., U.S. Pat. No. 5,967,793 to Ho et al., U.S. Pat. No. 6,039,575 to L'Allier, U.S. Pat. No. 6,064,856 to Lee et al., U.S. Pat. No. 6,118,973 to Ho et al., U.S. Pat. No. 6,146,148 to Stuppy, and U.S. Pat. No. 6,186,794 to Brown et al., these systems do not include, among other things, a modular teaching method wherein subject matter is organized into component skills, or constructs, described by the language of standards and presented in a modular learning packet along with an assessment and instructional materials.

SUMMARY OF THE INVENTION

The present invention provides a modular teaching method wherein cognitive constructs are presented in modular learning packets along with assessments and instructional materials such that the order in which the learning packets are presented is freely modifiable at the option of an administrator, comprising the steps of: dividing a body of knowledge into N cognitive constructs, providing a plurality of instructional materials, each of the instructional materials corresponding to at least one cognitive construct, providing N post-instruction assessments, each of the post-instruction assessments corresponding to a cognitive construct, associating one of the plurality of instructional materials and one of the N post-instruction assessments with each of the N cognitive constructs, wherein each association of an instructional material and a post-instruction assessment with a cognitive construct comprises a learning packet, providing the N learning packets to an administrator, the administrator ordering the N learning packets from 1 through k, wherein k is less than or equal to N, presenting the instructional material associated with each learning packet to a student, presenting the post-instruction assessment of the instructional material associated with each learning packet to the student, comparing a result of the post-instruction assessment of the instructional material associated with a current learning packet to a standard for that learning packet, presenting the instructional material associated with the next learning packet to the student if the result of the post-instruction assessment of the instructional material associated with the current learning packet is at least substantially equal to the standard for the current learning packet, or re-presenting the instructional material associated with the current learning packet to the student if the result of the post-instruction assessment of the instructional material associated with the current learning packet is lower than the standard for the current learning packet, and repeating the process for all the learning packets.

The present invention further provides a modular instruction system in which an administrator controls a presentation device, a body of knowledge is stored in the presentation device and divided into N cognitive constructs, a plurality of instructional materials and N post-instruction assessments are associated with the N cognitive constructs, at least one of the instructional materials and one of the post-instruction assessments for each of the cognitive constructs, with each association of an instructional material and a post-instruction assessment with a cognitive construct comprising a learning packet, and wherein the learning packets are presented to a student in the order of a sequence chosen by the administrator.

The present invention further provides a computer-implemented method of modular instruction in which a body of knowledge is divided into a plurality of cognitive constructs, a plurality of instructional materials is provided that correspond to the cognitive constructs, a plurality of post-instruction assessments is provided that correspond to the cognitive constructs, the instructional materials and the post-instruction assessments are associated with cognitive constructs by identifying the associated instructional materials, post-instruction assessments, and cognitive constructs in a data record to form learning packets, the learning packets are stored in the memory of a computer and provided to an administrator who is capable of ordering the sequence in which the learning packets are presented to students via an output device, the instructional material associated with a learning packet is presented via an output device to a student in accordance with the order of the sequence, the post-instruction assessment of the instructional material associated with a learning packet is presented via an output device to the student in accordance with the order of the sequence, a result of the post-instruction assessment completed by the student is received, stored in memory, and compared to a standard for the learning packet. If the result of the post-instruction assessment of the instructional material associated with the learning packet is at least substantially equal to the standard for that learning packet, the next instructional material and post-instruction assessment associated with the next learning packet in the order of the sequence is presented. Otherwise, if the result of the post-assessment of the instructional material associated with the learning packet is not at least substantially equal to the standard for that learning packet, remedial instructional material for the same learning packet is presented to the student.

The present invention further provides a method of modular instruction of a body of knowledge divided into plural cognitive constructs using at least one instructional material corresponding to one of the cognitive constructs and at least one post-instruction assessment corresponding to the cognitive construct, wherein instructional materials and post-instruction assessments corresponding to a particular cognitive construct comprise a learning packet. The method comprises the steps of a) ordering k learning packets for a given body of knowledge in a sequence j from 1 through k, wherein k is less than or equal to the total number of learning packets available for the given body of knowledge, b) presenting the instructional material associated with a jth learning packet to a student, c) presenting the post-instruction assessment of the instructional material associated with the jth learning packet to the student, d) comparing a result of the post-instruction assessment of the instructional material associated with the jth learning packet to a standard for the jth learning packet, and e) repeating steps b) through d) using the next learning packet in the sequence if the result of the post-instruction assessment of the instructional material for the previous learning packet is found to be at least substantially equal to the standard for the previous learning packet in step d). Preferably, step a) includes ordering the learning packets from a remote site via the Internet. The method can also include rearranging a sequence of the learning packets either before any learning packets have been presented to the student or after at least one learning packet has already been presented.

The present invention further provides a method of modular instruction comprising the steps of a) dividing a body of knowledge into N cognitive constructs, b) providing a plurality of instructional materials in electronic format, each of said instructional materials corresponding to at least one cognitive construct, c) providing a plurality of post-instruction assessments in electronic format, each of said post-instruction assessments corresponding to at least one cognitive construct, d) associating at least one of said plurality of instructional materials and one of said plurality of post-instruction assessments with each of said N cognitive constructs, wherein each said association of an instructional material and a post-instruction assessment with a cognitive construct comprises a learning packet, e) receiving an order for k learning packets for a given body of knowledge in a sequence j from 1 through k, wherein k is less than or equal to the total number N of learning packets available for the given body of knowledge, and f) transmitting the learning packets in an electronic format in response to the order received in step e). In a preferred embodiment, step f) includes transmitting the learning packets over the Internet. The method may also include the step of g) displaying the N learning packets corresponding to a body of knowledge in a sequence on a website accessible via the Internet.

BRIEF DESCRIPTION OF THE DRAWINGS

The invention will be described in detail with reference to the following drawings, in which:

FIG. 1 is a flow chart of a method of modular instruction using cognitive constructs according to a first embodiment of the present invention;

FIG. 2 is a block diagram of a system for assembling learning packets according to the embodiment of FIG. 1;

DETAILED DESCRIPTION OF THE PREFERRED EMBODIMENTS

Figure 2A:
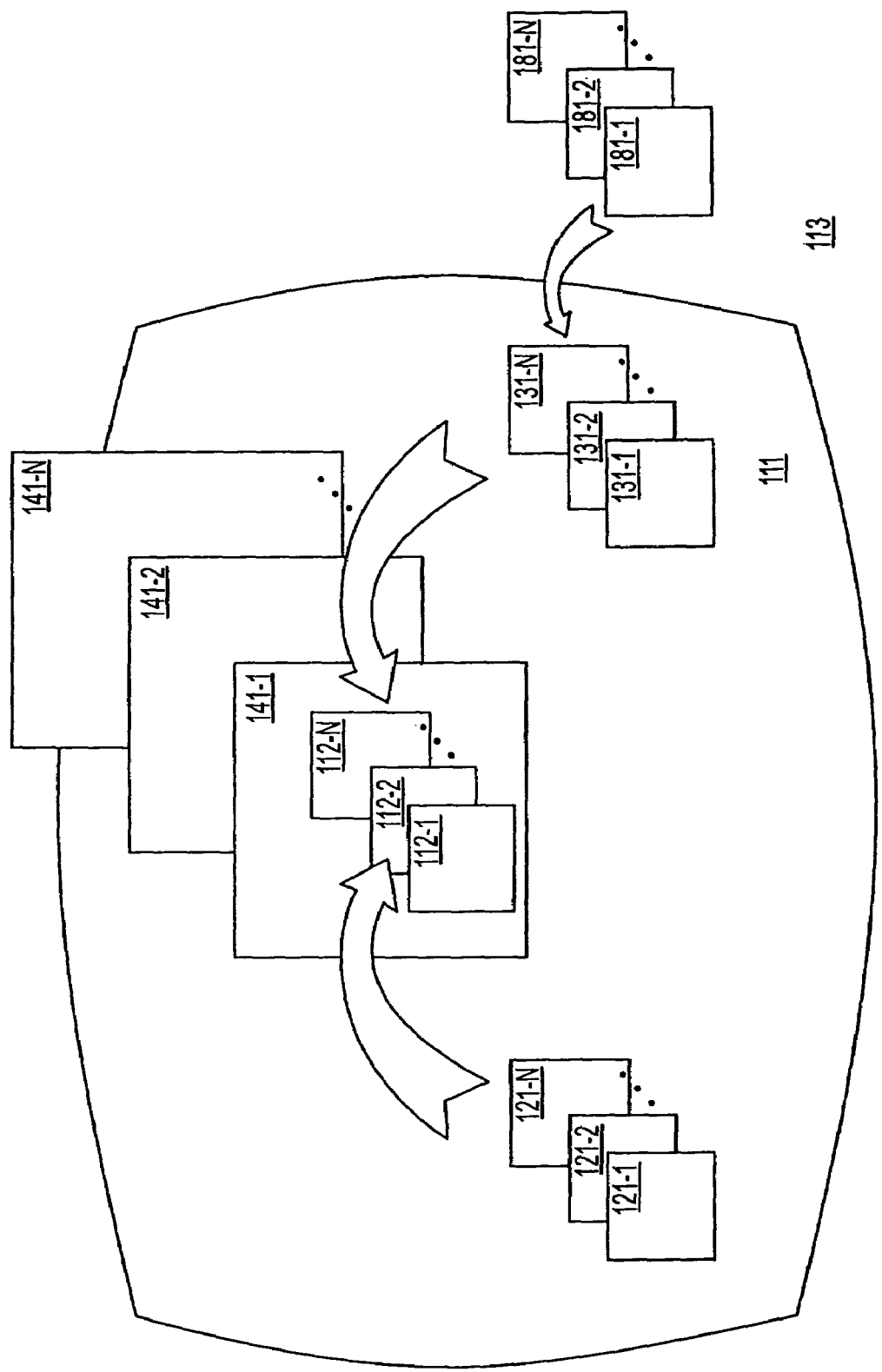
FIGS. 2A and 2B illustrate a modification of a learning packet for use with a method of modular instruction according to the present invention.

A modular instruction method 100 according to a first embodiment of the present invention is now described with reference to FIGS. 1 through 5. The ordering process that is included in the method of modular instruction and described with reference to the accompanying figures is presented in a tabular format in the interest of compact, concise presentation. The tabular format in which the ordering process is described is a shorthand representation of an ordering process that will be familiar to, for example, mathematicians and software engineers. However, whether or not one practicing the method of modular instruction uses such a tabular format, or even consciously assigns any index, counter, delimiter, or place holder to the various elements of the method of modular instruction described in the accompanying figures, is not critical to the practice of the method of modular instruction.

In step 110, shown in FIG. 1, a body of knowledge 111, shown in FIG. 2, stored in a presentation device 113 is divided into N cognitive constructs 112-1 through 112-N. Body of knowledge 111 pertains to a subject such as mathematics, algebra, geometry, trigonometry, calculus, social science, differential equations, logic, reading, physics, history, art, literature, language, natural science, geography, philosophy, drama, chemistry, life science, biology, botany, Newtonian physics, quantum physics, spelling, forensics, genetics, Boolean logic, addition, subtraction, multiplication, division, integration, differentiation, probability, statistics, economics, cooking, shop, baking, drafting, design, composition, or any other suitable body of knowledge. The invention can be used to provide instruction at any level including, but not limited to, pre-school, kindergarten, primary and secondary school, college, graduate school, professional school, vocational school, adult continuing education, corporate training, and professional certification. In a preferred embodiment presentation device 113 is a workstation in the form of a personal computer, but it may also be a laptop computer, a notebook computer, a handheld computer, a palmtop computer, a game console, a mainframe computer, a mini-computer, a micro-computer, a digital computer, an analog computer, an organic computer, an emulator, a thin client, a digital signal processor, or any other suitable means of presentation, or any combination thereof.

In step 120 N instructional materials 121-1 through 121-N are mapped to the N cognitive constructs 112-1 through 112-N, as shown in FIG. 2. Each of instructional materials 121-1 through 121-N is preferably embodied in an interactive presentation, but instructional materials 121-1 through 121-N may also be embodied in a book, a video, a slide, a recording, a program, a film, a movie, a photograph, an experiment, a field trip, a lecture, an E-mail, a demonstration, a game, a text file, or any other suitable medium, or any combination thereof. Each of instructional materials 121-1 through 121-N is preferably an assignment, but instructional materials 121-1 through 121-N may also be a project, a task, a selection, a file, or any other suitable instruction material, or any combination thereof.

Figure 2B:
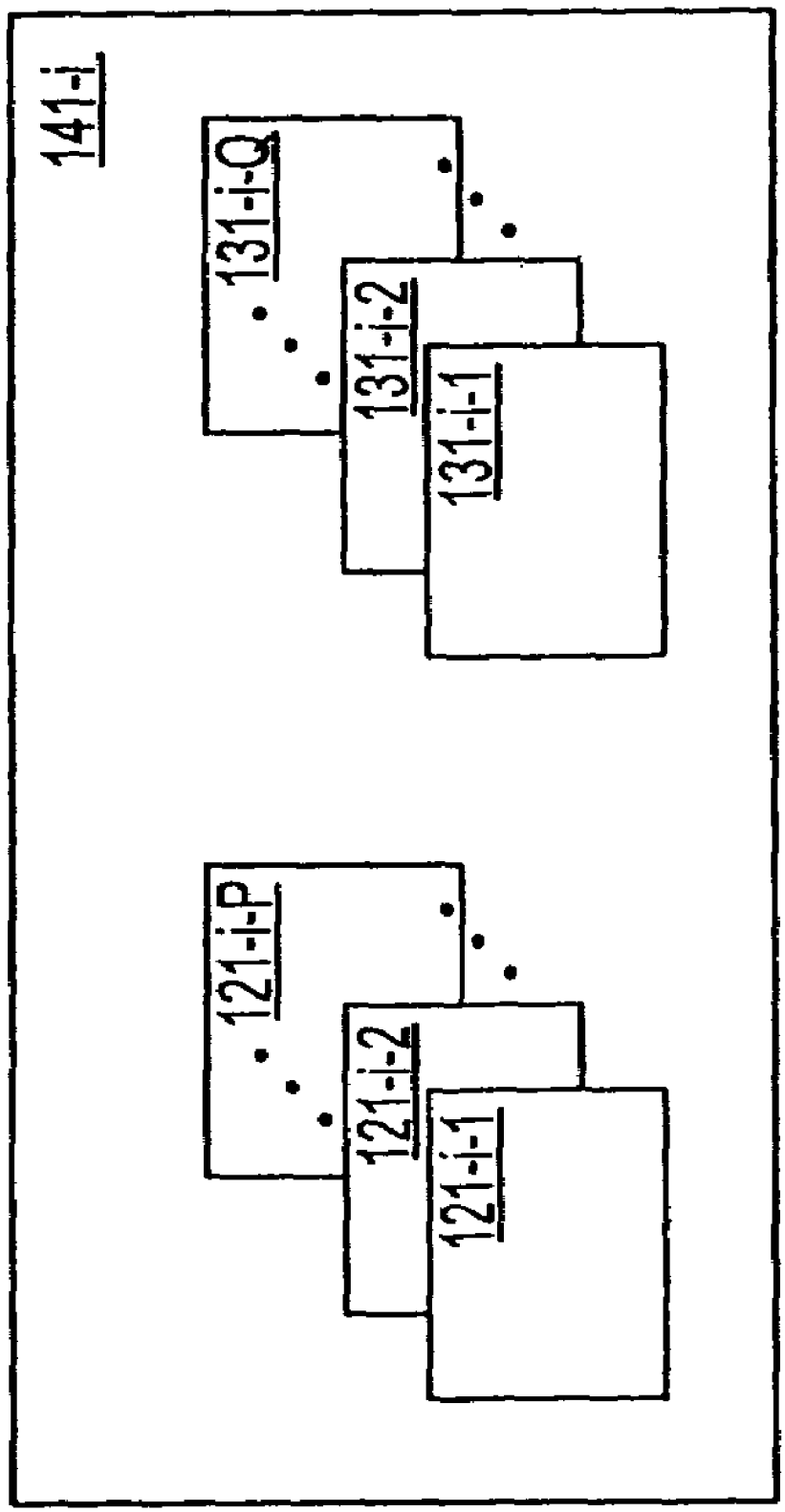

In step 130 N post-instruction assessments 131-1 through 131-N are mapped one-to-one to cognitive constructs 112-1 through 112-N, as shown in FIG. 2. Each of post-instruction assessments 131-1 through 131-N is preferably a quiz, but post-instruction assessments 131-1 through 131-N may also be a test, a contest, a judgement, an appraisal, an open-book test, a closed-book test, an examination, an oral examination, a diagnostic test, or any other suitable form of assessment, or any combination thereof. Standards 181-1 through 181-N are integral with post-instruction assessments 131-1 through 131-N. Each of standards 181-1 through 181-N is preferably a proficiency standard, but standards 181-1 through 181-N may also be a norm, an average, a mean, a median, a quartile, a percentage, a goal, a target, a benchmark, or any other suitable means of comparison, or any combination thereof. Each mapping of one of instructional materials 121-1 through 121-N and one of post-instruction assessments 131-1 through 131-N to one of cognitive constructs 112-1 through 112-N comprises one of learning packets 141-1 through 141-N, as shown in FIG. 2. There are thus N learning packets 141-1 to 141-N. It will be appreciated that each learning packet can include one or more instructional materials and one or more post-instruction assessments. For example, as shown in FIG. 2A, a single learning packet 141-$i$ can include multiple versions of instructional material 121-$i$-1 to 121-$i$-P and/or multiple versions of post-instructional assessments 131-$i$-1 to 131-$i$-Q for a particular cognitive construct, where P and Q are integers equal to the number of versions available (see also FIG. 2B). It is thus possible to customize the instructional material and/or assessment presented to a student as part of a learning packet. The multiple versions within a learning packet can include, for example, versions produced by different educational publishers, versions in different languages, versions developed to accommodate students with special needs, and versions tailored for other purposes, thereby allowing packet customization either through manual selection by an administrator, teacher, etc., or automatic selection by the system in response to student profile or performance, preselected criteria, etc. It should be noted that the number of versions P of the instructional material may be equal to or different from the number of versions Q of the assessments. There may also be multiple versions of standards corresponding to respective assessments.

Figure 3:
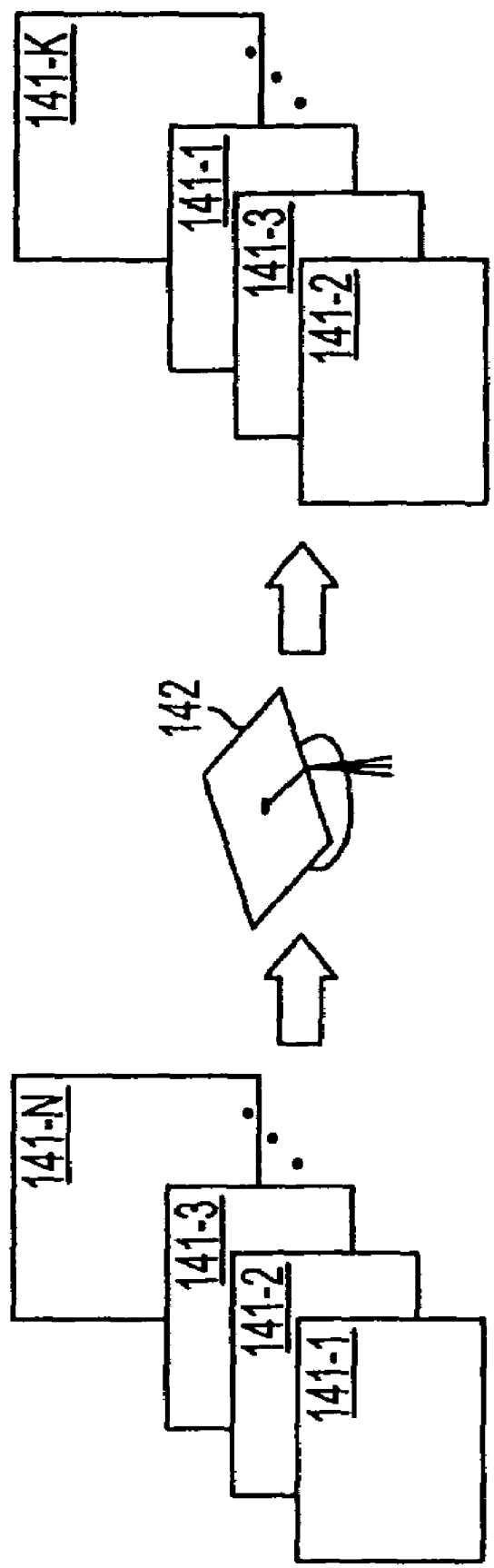
FIG. 3 is a perspective view of ordering learning packets according to the embodiment of FIG. 1.

In step 140 the N learning packets 141-1 to 141-N are provided to an administrator 142, as shown in FIG. 3, who assigns a sequence j to the N learning packets 141-1 to 141-N in step 150. In one embodiment, administrator 142 is a teacher, but administrator 142 may also be a dean, a superintendent, a teacher's aide, an intern, a manager, an instructor, a pedagogue, a coach, a mentor, a leader, a trainer, a board, a district, a school, a panel, a committee, an association, a guild, or any other suitable administrator or suitably authorized person, or any combination thereof. In a preferred embodiment, sequence j ranges from 1 through k. In one embodiment, k is equal to N, which corresponds to the case where the administrator 142 chooses to use all of the N learning packets 141-1 to 141-N. Otherwise k is less than N. By assigning the sequence j from 1 to k to the learning packets 141-1 to 141-N, administrator 142 assigns an order to learning packets 141-1 to 141-N. The administrator 142 determines the particular order in which the sequence j maps to the learning packets 141-1 to 141-N. Administrator 142 does not, however, need to actively order learning packets 141. In a preferred embodiment a sample, super set, or suggested order for learning packets 141 will be provided to administrator 142 as a default order for learning packets 141. It is also preferable that by choosing to accept the default order, administrator 142 is also ordering the learning packets 141.

Figure 4:
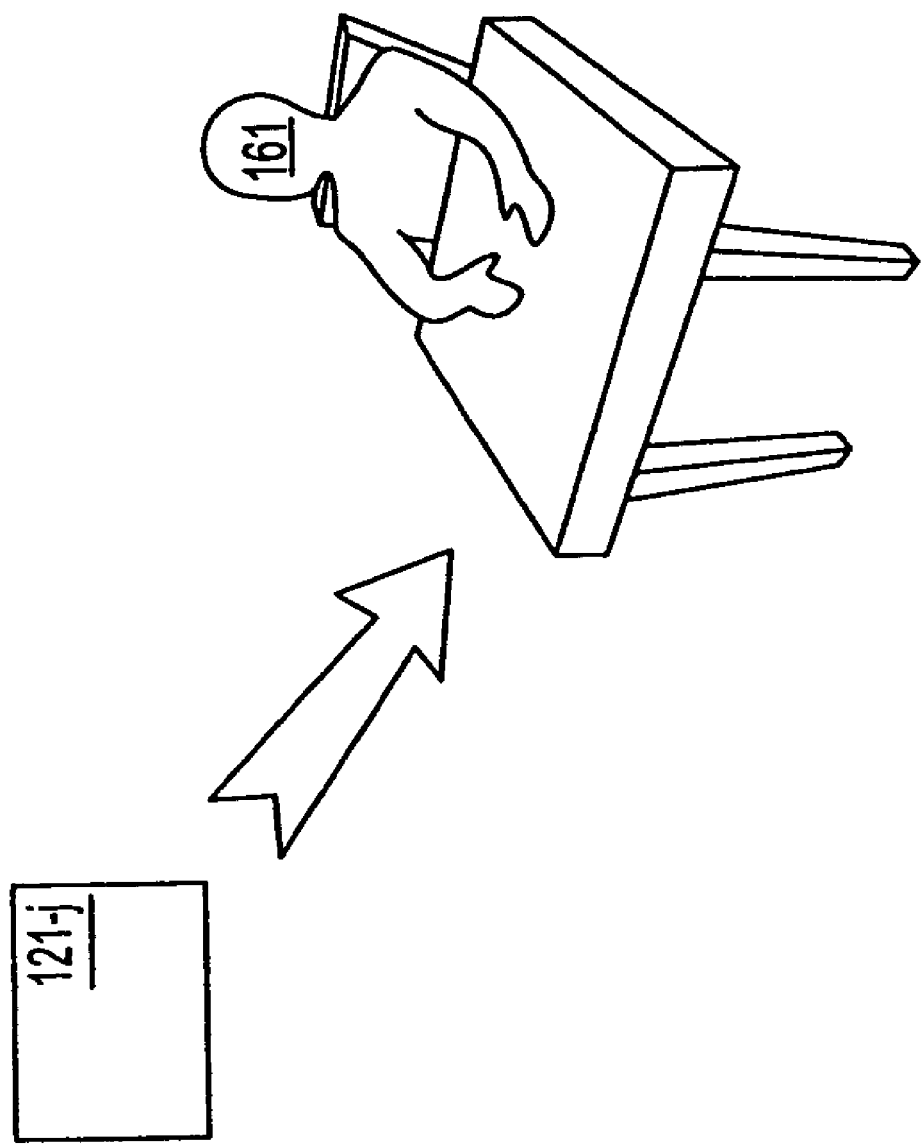
FIG. 4 is a perspective view of instruction according to the embodiment of FIG. 1.

In step 155, shown in FIG. 1, sequence j is set equal to 1; that is, the first learning packet in the order chosen by administrator 142 is selected for presentation. In step 160, shown in FIG. 1, instructional material 121-$j$ associated with the jth learning packet 141-$j$ in the order chosen by the administrator 142 is presented to a student 161, as shown in FIG. 4. If the sequence j is, for example, equal to 1 the first learning packet in the order chosen by administrator 142 will be presented to student 161.

Figure 5:
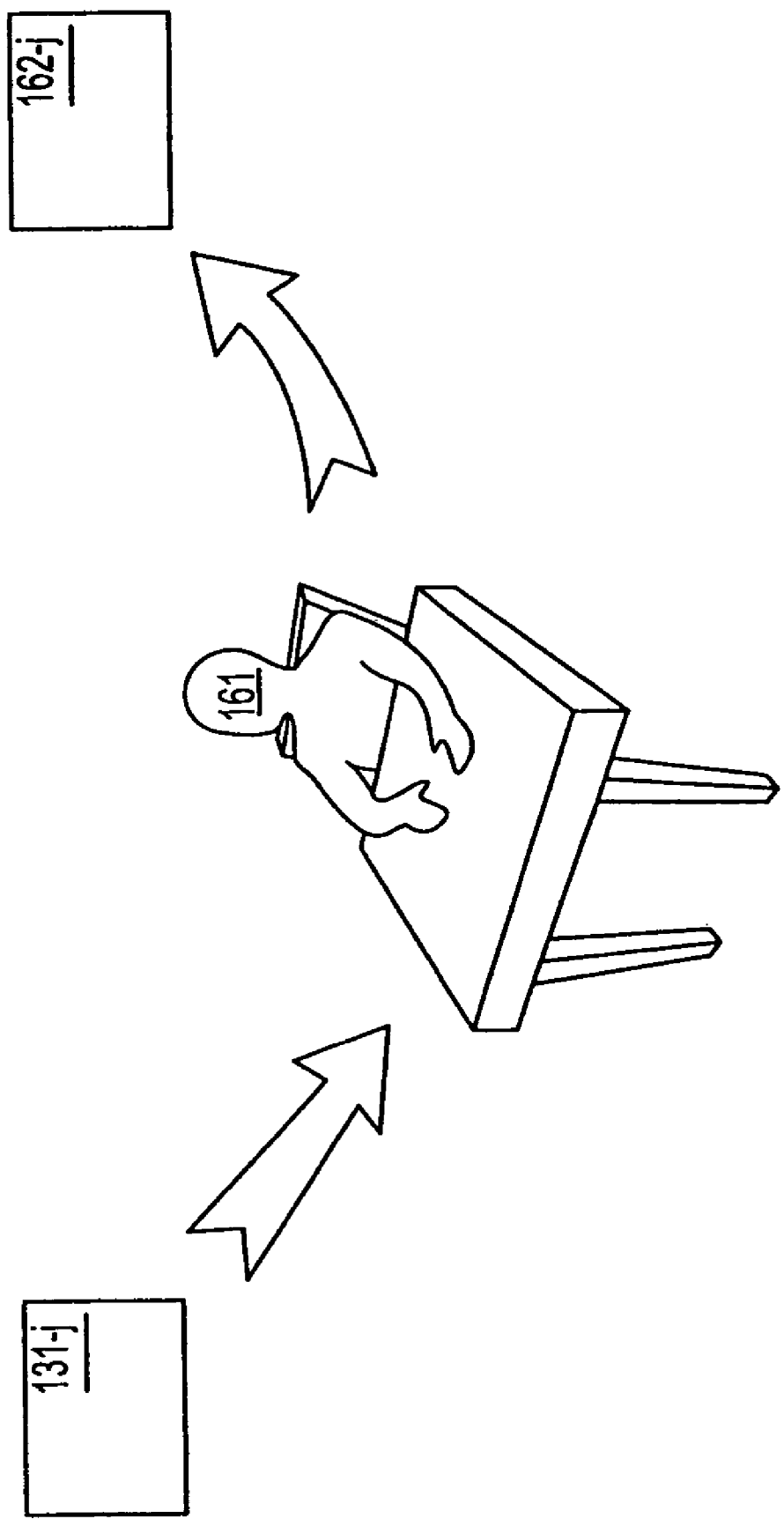
FIG. 5 is a perspective view of post-instruction assessment according to the embodiment of FIG. 1.

In step 170, shown in FIG. 1, post-instruction assessment 131-$j$ associated with the jth learning packet 141-$j$ in the order chosen by the administrator 142 is given to student 161, as shown in FIG. 5. If the sequence j, for example, is equal to 1 the post-instruction assessment associated with the first learning packet in the order chosen by administrator 142 will be given to student 161. Step 170 produces a result 162-$j$ of post-instruction assessment 131-$j$ for student 161. In a preferred embodiment result 162-$j$ is a score, but result 162-$j$ may also be an average, a mean, a median, a quartile, a percentage, an indication, a grade, or any other suitable proxy for the performance of student 161 on post-instruction assessment 131-j, or any combination thereof.

In step 175, shown in FIG. 1, result 162-j of the post-instruction assessment 131-j is compared to a standard 181-j for the jth learning packet. If result 162-j is at least substantially equal to standard 181-j, then the current learning packet is checked in step 180 to see whether the current learning packet is learning packet 141-k, that is, if student 161 has completed all k learning packets. If the current learning packet is learning packet 141-k, the process ends. If not, sequence j is incremented by 1 in step 190, and the process returns to step 160 for presentation of the instructional material associated with the next learning packet in the order chosen by administrator 142. Otherwise, if result 162-j is lower than standard 181-j, sequence j is not incremented, and the process also returns to step 160, but for re-presentation of the instructional material associated with the current learning packet in the order chosen by administrator 142. Steps 160 through 175 are repeated until result 162-k, that is, the result of the post-instruction assessment associated with the last learning packet in the order chosen by administrator 142 is at least substantially equal to standard 181-k.

A modular instruction method 200 according to a second embodiment of the present invention is now described with reference to FIGS. 4 through 9. Elements described with respect to the first embodiment that perform similar functions in this embodiment retain the labels they were given in FIGS. 1 through 5. The second embodiment is adapted to a student 161 who is able to place out of the instructional material associated with a learning packet by passing a pre-instruction assessment.

Figure 6:
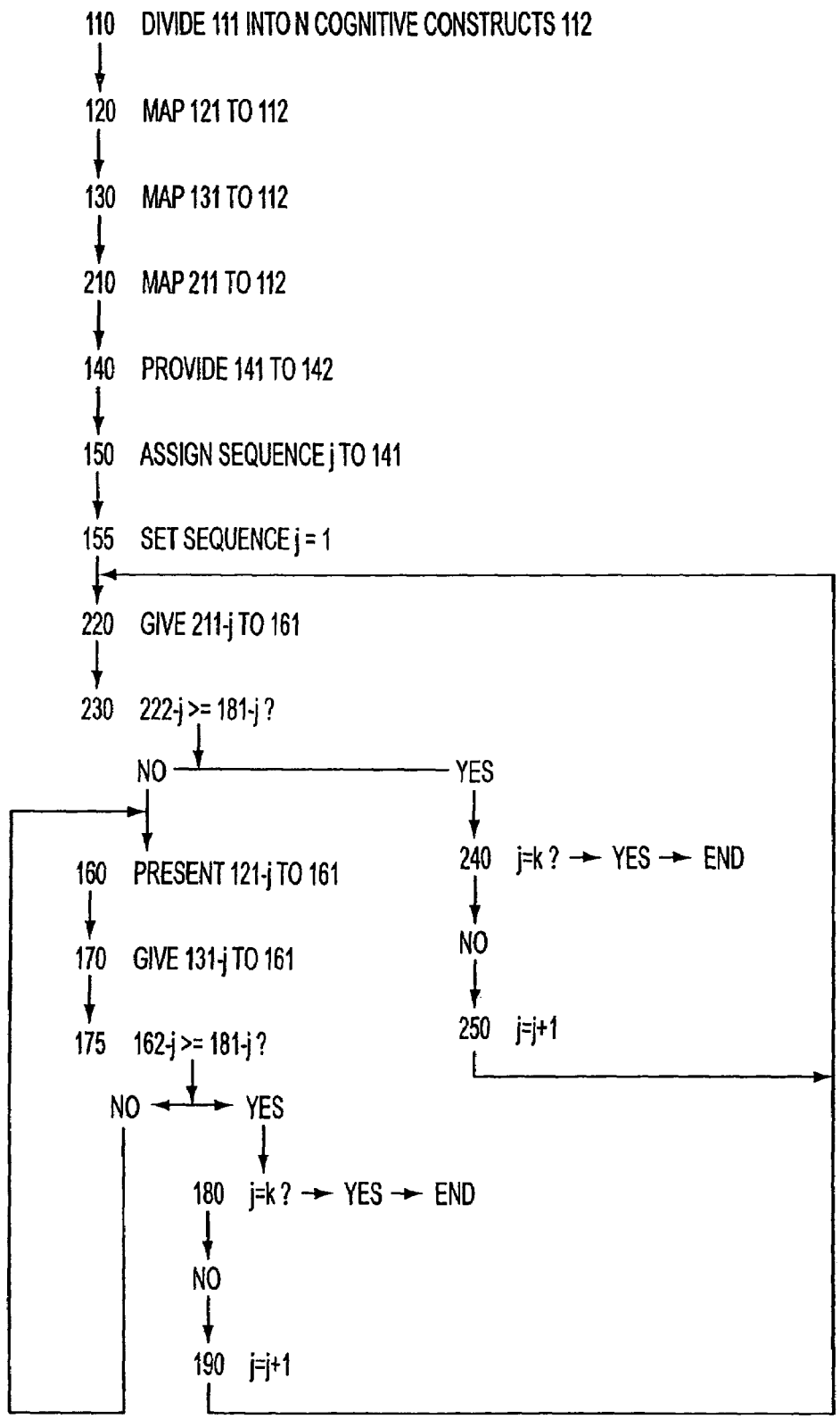
FIG. 6 is a flow chart of a method of modular instruction using cognitive constructs according to a second embodiment of the present invention.
Figure 7:
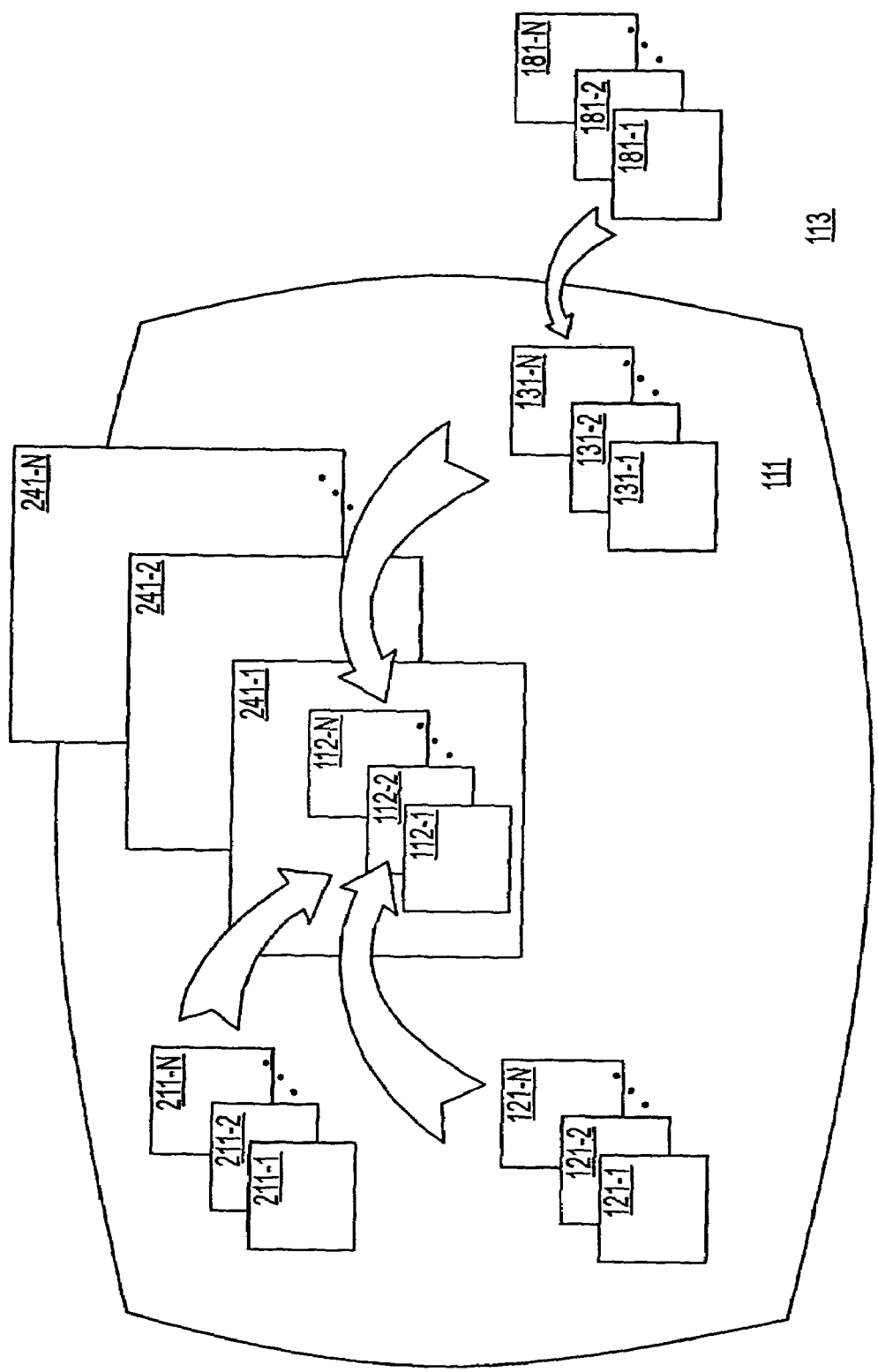
FIG. 7 is a block diagram of a system for assembling learning packets according to the embodiment of FIG. 6.

In step 110, shown in FIG. 6, body of knowledge 111, shown in FIG. 7, stored in a presentation device 113 is divided into N cognitive constructs 112-1 through 112-N. In step 120, shown in FIG. 6, N instructional materials 121-1 through 121-N are mapped one-to-one to the N cognitive constructs 112-1 through 112-N, as shown in FIG. 7. In step 130, shown in FIG. 6, N post-instruction assessments 131-1 through 131-N are mapped one-to-one to cognitive constructs 112-1 through 112-N, as shown in FIG. 7. Standards 181-1 through 181-N are integral with post-instruction assessments 131-1 through 131-N.

In step 210, shown in FIG. 6, N pre-instruction assessments 211-1 through 211-N are mapped one-to-one to cognitive constructs 112-1 through 112-N. Each of pre-instruction assessments 211-1 through 211-N is preferably a quiz, but pre-instruction assessments 211-1 through 211-N may also be a test, a contest, a judgement, an appraisal, an open-book test, a closed-book test, an examination, an oral examination, a diagnostic test, or any other suitable form of assessment, or any combination thereof. Each mapping of one of instructional materials 121-1 through 121-N, one of post-instruction assessments 131-1 through 131-N, and one of pre-instruction assessments 211-1 through 211-N to one of cognitive constructs 112-1 through 112-N comprises one of learning packets 241-1 through 241-N, as shown in FIG. 7. There are thus N learning packets 241-1 to 241-N. It should be noted that pre-instruction assessments and post-instruction assessments can be interchangeable so that, for example, a single set of assessments can be provided in each learning packet and drawn from for both pre-instruction and post-instruction assessment. Safeguards can be provided to prevent a particular assessment from being presented as both a pre-instruction and post-instruction assessment to the same student. As mentioned above, there can be different versions of the instruction material, assessments and standards available in a learning packet.

Figure 8:
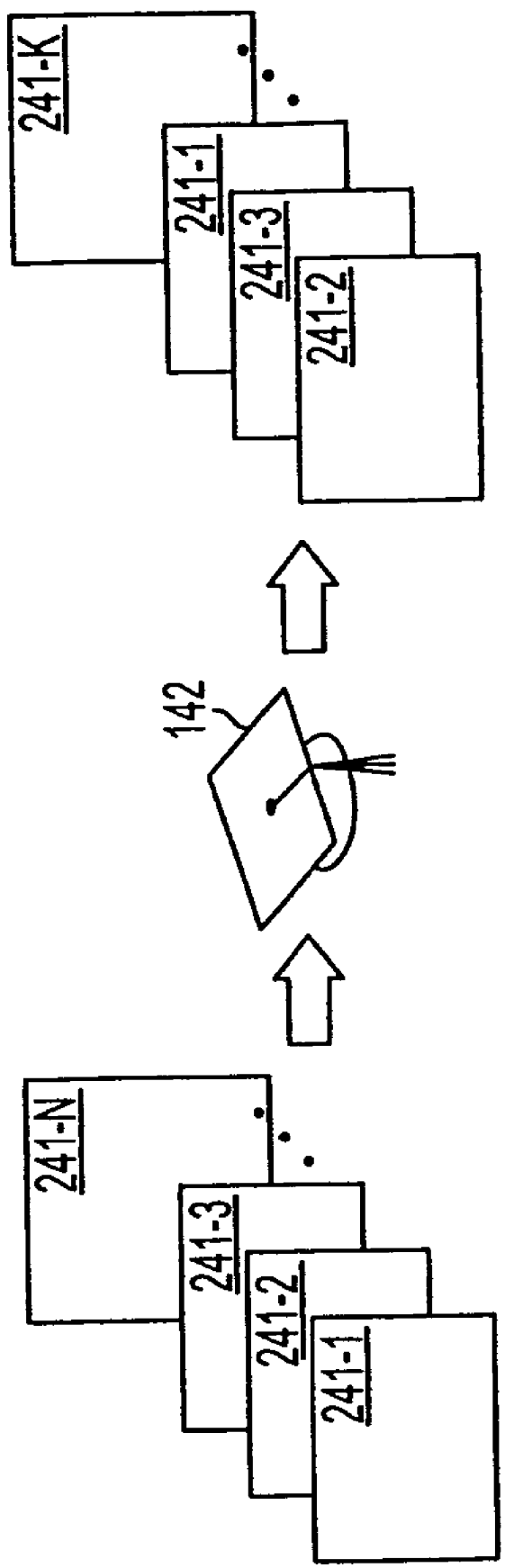
FIG. 8 is a perspective view of ordering learning packets according to the embodiment of FIG. 6.

In step 140, shown in FIG. 6, the N learning packets 241-1 to 241-N are provided to an administrator 142, as shown in FIG. 8, who assigns a sequence j to the N learning packets 241-1 to 241-N in step 150. In a preferred embodiment, sequence j ranges from 1 through k. In a preferred embodiment, k is equal to N, which corresponds to the case where the administrator 142 chooses to use all of the N learning packets 241-1 to 241-N. Otherwise k is less than N. By assigning the sequence j from 1 to k to the learning packets 241-1 to 241-N, administrator 142 assigns an order to learning packets 241-1 to 241-N. The particular order in which the sequence j maps to the learning packets 241-1 to 241-N is up to the administrator 142. Administrator 142 does not, however, need to actively order learning packets 241. In a preferred embodiment a sample, super set, or suggested order for learning packets 241 will be provided to administrator 142 as a default order for learning packets 241. By choosing to accept the default order administrator 142 is also ordering the learning packets 241.

Figure 9:
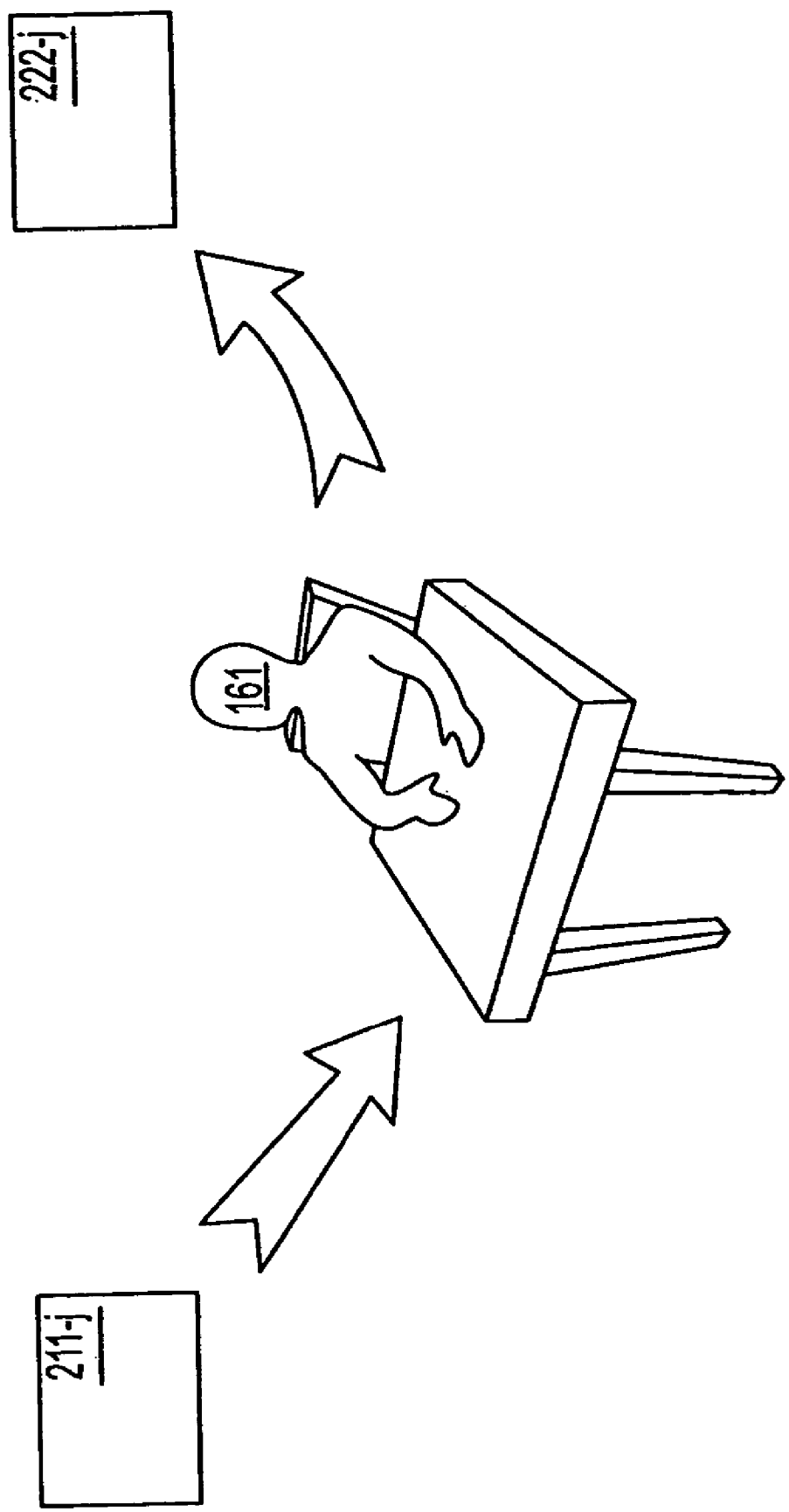
FIG. 9 is a perspective view of pre-instruction assessment according to the embodiment of FIG. 6.

In step 155, shown in FIG. 6, sequence j is set equal to 1, that is, the first learning packet in the order chosen by administrator 142 is selected for presentation. In step 220, shown in FIG. 6, pre-instruction assessment 211-j of instructional material 121-j associated with the jth learning packet 141-j is given to student 161, as shown in FIG. 9. Student 161 completes pre-instruction assessment 211-j, producing a result 222-j. In a preferred embodiment result 222-j is a score, but result 222-j may also be an average, a mean, a median, a quartile, a percentage, an indication, a grade, or any other suitable proxy for the performance of student 161 on pre-instruction assessment 211-j, or any combination thereof.

In step 230, shown in FIG. 6, result 222-j of the pre-instruction assessment 211-j is compared to standard 181-j for the jth learning packet. If result 222-j is at least substantially equal to standard 181-j, then the current learning packet is checked in step 240 to see whether the current learning packet is learning packet 241-k, that is, if student 161 has completed all k learning packets. If the current learning packet is learning packet 241-k, the process ends. If not, sequence j is incremented by 1 in step 250, and the process returns to step 220 for presentation of the pre-instructional assessment associated with the next learning packet in the order chosen by administrator 142. Otherwise, if result 222-j is lower than standard 181-j, the process proceeds to step 160.

In step 160, shown in FIG. 6, instructional material 121-j associated with the jth learning packet 241-j in the order chosen by the administrator 142 is presented to a student 161, as shown in FIG. 4.

In step 170, shown in FIG. 6, post-instruction assessment 131-j associated with the jth learning packet 241-j in the order chosen by the administrator 142 is given to student 161, as shown in FIG. 5. If the sequence j, for example, is equal to 1 the post-instruction assessment associated with the first learning packet in the order chosen by administrator 142 will be given to student 161. The order, format, and/or verbiage of the elements of the post-instruction assessment may be varied, as would be known to one skilled in the art, with each subsequent presentation of the post-instruction assessment associated with a particular learning packet. Step 170 produces a result 162-j of post-instruction assessment 131-j for student 161.

In step 175, shown in FIG. 6, result 162-$j$ of the post-instruction assessment 131-$j$ is compared to a standard 181-$j$ for the jth learning packet. If result 162-$j$ is at least substantially equal to standard 181-$j$, then the current learning packet is checked in step 180 to see whether the current learning packet is learning packet 241-$k$, that is, if student 161 has completed all k learning packets. If the current learning packet is learning packet 241-$k$, the process ends. If not, sequence j is incremented by 1 in step 190, and the process returns to step 220 for presentation of the pre-instruction assessment associated with the next learning packet in the order chosen by administrator 142. Otherwise, if result 162-$j$ is lower than standard 181-$j$, sequence j is not incremented, and the process returns to step 160 for re-presentation of the instructional material associated with the current learning packet in the order chosen by administrator 142. Steps 160 through 175 are repeated until result 162-$k$, that is, the result of the post-instruction assessment associated with the current learning packet in the order chosen by administrator 142 is at least substantially equal to standard 181-$k$. Steps 220 through 250 and/or steps 160 through 175 are then repeated until either result 162-$k$ or result 222-$k$ is at least substantially equal to standard 181-$k$.

A modular instruction method 300 according to a third embodiment of the present invention is now described with reference to FIGS. 2 through 5 and 10. Elements described with respect to the first embodiment that perform similar functions in this embodiment retain the labels they were given in FIGS. 1 through 5. The third embodiment is adapted to a student 161 who is not absorbing instructional material associated with a current learning packet at an acceptable pace.

Figure 10:
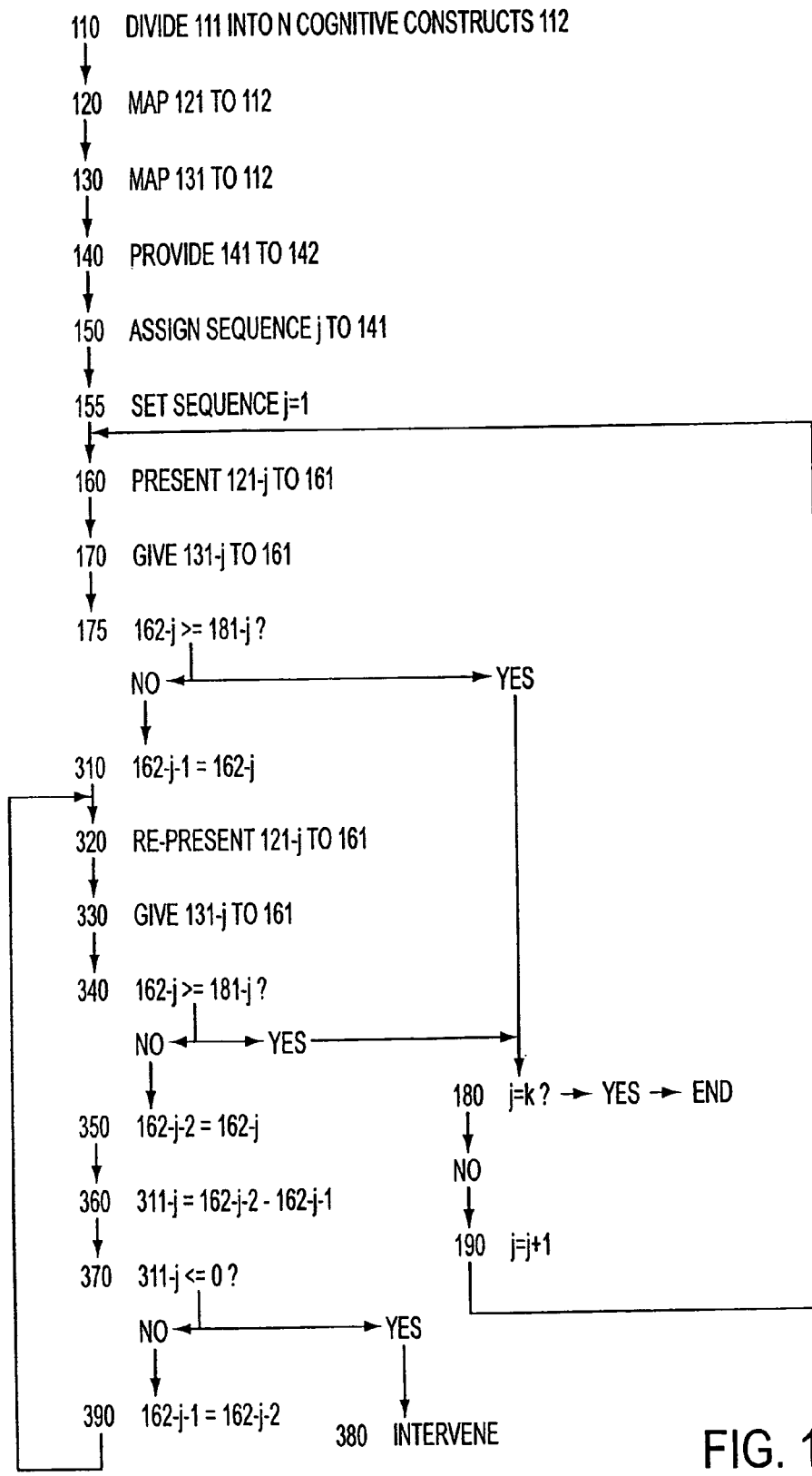
FIG. 10 is a flow chart of a method of modular instruction using cognitive constructs according to a third embodiment of the present invention.

In step 110, shown in FIG. 10, a body of knowledge 111 stored in a presentation device is divided into N cognitive constructs 112-1 through 112-N, as shown in FIG. 2. In step 120, shown in FIG. 10, N instructional materials 121-1 through 121-N are mapped one-to-one to the N cognitive constructs 112-1 through 112-N, as shown in FIG. 2. In step 130, shown in FIG. 10, N post-instruction assessments 131-1 through 131-N are mapped one-to-one to cognitive constructs 112-1 through 112-N, as shown in FIG. 2. Standards 181-1 through 181-N are integral with post-instruction assessments 131-1 through 131-N. Each mapping of one of instructional materials 121-1 through 121-N and one of post-instruction assessments 131-1 through 131-N to one of cognitive constructs 112-1 through 112-N comprises one of learning packets 141-1 through 141-N. There are thus N learning packets 141-1 to 141-N.

In step 140, shown in FIG. 10, the N learning packets 141-1 to 141-N are provided to an administrator 142, as shown in FIG. 3, who assigns a sequence j to the N learning packets 141-1 to 141-N in step 150. In a preferred embodiment, sequence j ranges from 1 through k. In a preferred embodiment, k is equal to N, which corresponds to the case where the administrator 142 chooses to use all of the N learning packets 141-1 to 141-N. Otherwise k is less than N. By assigning the sequence j from 1 to k to the learning packets 141-1 to 141-N, administrator 142 assigns an order to learning packets 141-1 to 141-N. The particular order in which the sequence j maps to the learning packets 141-1 to 141-N is up to the administrator 142. Administrator 142 does not, however, need to actively order learning packets 141. In a preferred embodiment a sample, super set, or suggested order for learning packets 141 will be provided to administrator 142 as a default order for learning packets 141. By choosing to accept the default order administrator 142 is also ordering the learning packets 141.

In step 155, shown in FIG. 10, sequence j is set equal to 1, that is, the first learning packet in the order chosen by administrator 142 is selected for presentation. In step 160, shown in FIG. 10, instructional material 121-$j$ associated with the jth learning packet 141-$j$ in the order chosen by the administrator 142 is presented to a student 161, as shown in FIG. 4. If the sequence j is, for example, equal to 1 the first learning packet in the order chosen by administrator 142 will be presented to student 161.

In step 170, shown in FIG. 10, post-instruction assessment 131-$j$ associated with the jth learning packet 141-$j$ in the order chosen by the administrator 142 is given to student 161, as shown in FIG. 5. If the sequence j, for example, is equal to 1 the post-instruction assessment associated with the first learning packet in the order chosen by administrator 142 will be given to student 161. Step 170 produces a result 162-$j$ of post-instruction assessment 131-$j$ for student 161.

In step 175, shown in FIG. 10, result 162-$j$ of the post-instruction assessment 131-$j$ is compared to a standard 181-$j$ for the jth learning packet. If result 162-$j$ is at least substantially equal to standard 181-$j$, then the current learning packet is checked in step 180 to see whether the current learning packet is learning packet 141-$k$, that is, if student 161 has completed all k learning packets. If the current learning packet is learning packet 141-$k$, the process ends. If not, sequence j is incremented by 1 in step 190, and the process returns to step 160 for presentation of the instructional material associated with the next learning packet in the order chosen by administrator 142. Otherwise, if result 162-$j$ is lower than standard 181-$j$, sequence j is not incremented, and the process proceeds to step 310, where result 162-$j$ is copied to result 162-$j$-1.

In step 320, shown in FIG. 10, instructional material 121-$j$ associated with the current learning packet in the order chosen by administrator 142 is re-presented to student 161. In step 330, shown in FIG. 10, post-instruction assessment 131-$j$ associated with the jth learning packet 141-$j$ in the order chosen by the administrator 142 is given to student 161. The order, format, and/or verbiage of the elements of the post-instruction assessment may be varied, as would be known to one skilled in the art, with each subsequent presentation of the post-instruction assessment associated with a particular learning packet. Step 330 produces a result 162-$j$ of post-instruction assessment 131-$j$ for student 161.

In step 340, shown in FIG. 10, result 162-$j$ of the post-instruction assessment 131-$j$ is compared to a standard 181-$j$ for the jth learning packet. If result 162-$j$ is at least substantially equal to standard 181-$j$, then the current learning packet is checked in step 180 to see whether the current learning packet is learning packet 141-$k$, that is, if student 161 has completed all k learning packets. If the current learning packet is learning packet 141-$k$, the process ends. If not, sequence j is incremented by 1 in step 190, and the process returns to step 160 for presentation of the instructional material associated with the next learning packet in the order chosen by administrator 142. Otherwise, if result 162-$j$ is lower than standard 181-$j$, sequence j is not incremented, and the process proceeds to step 350, where result 162-$j$ is copied to result 162-$j$-2.

In step 360, shown in FIG. 10, a difference 311-$j$ is computed between a result 162-$j$-2 of post-instruction assessment 131-$j$ of the instructional material 121-$j$ associated with learning packet 141-$j$ taken after instructional material 121-$j$ associated with learning packet 141-$j$ was re-presented and result 162-$j$-1 of the post-instruction assessment 131-$j$ of the instructional material 121-$j$ associated with learning packet 141-$j$ taken before instructional material 121-*j* associated with learning packet 141-*j* was re-presented. Difference 311-*j* is thus an indicator of the rate at which student 161 is absorbing the instructional material 121-*j* associated with learning packet 141-*j*. If difference 311-*j* is negative or substantially equal to zero, that is, if student 161 is not absorbing the instructional material 121-*j* associated with learning packet 141-*j*, the process proceeds to step 380 where the administrator 142 may intervene in the presentation of instructional material 121-*j*. In a preferred embodiment the intervention takes the form of performing a needs assessment, but the intervention may also take the form of replacing instructional material 121-*j*, sub-dividing the instructional material 121-*j*, slowing down the presentation of the instructional material 121-*j*, or any other suitable form of intervention, or any combination thereof. Otherwise, if difference 311-*j* is positive, that is, if result 162-*j*-2 shows an improvement over 162-*j*-1, the process proceeds to step 390, where result 162-*j*-2 is copied to 162-*j*-1, after which the process returns to step 320 for further re-presentation of instructional material 121-*j*.

Steps 160 through 175 and/or steps 310 through 340 are then repeated until result 162-*k*, that is, the result of the post-instruction assessment associated with the last learning packet in the order chosen by administrator 142 is at least substantially equal to standard 181-*k*.

Figure 11:
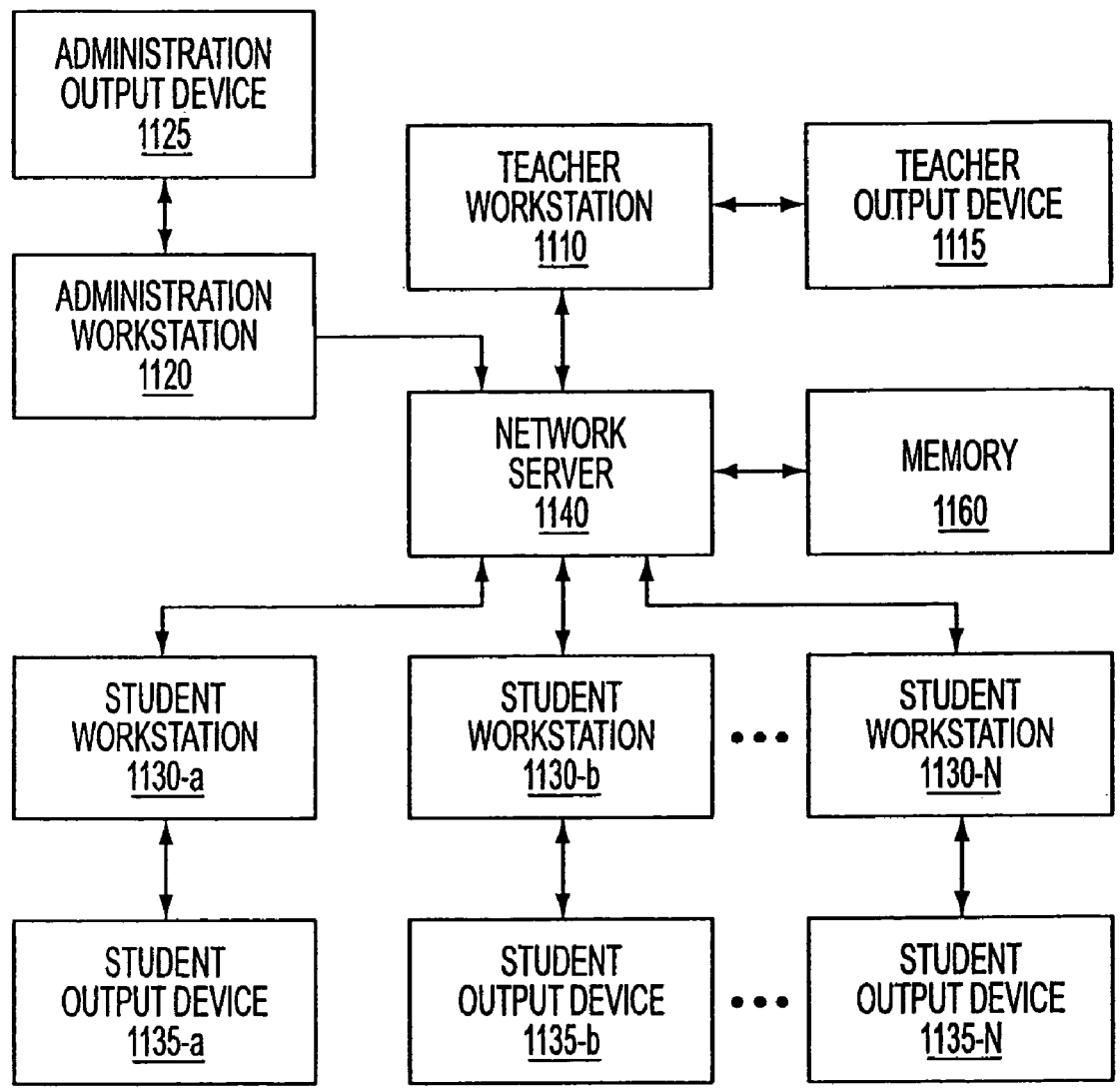
FIG. 11 is a block diagram of a system of modular instruction using cognitive constructs according to any of the embodiments of the present invention.

A system 1100 suitable for implementing any of the aforementioned embodiments of the modular method of instruction is now described with reference to FIG. 11. A teacher workstation 1110, an administration workstation 1120, and student workstations 1130 are shown linked to each other via network server 1140. Alternatively, student workstations 1130 can be connected to the network server 1140 via the teacher workstation 1110. Each of the workstations 1110, 1120, and 1130 is preferably a computer system having one or more input devices (e.g., a keyboard, a pointing device, a microphone, or a combination of two or more of the foregoing) and one or more output devices (e.g., a visual display, a printer, a speaker, or a combination of two or more of the foregoing). In a preferred embodiment teacher workstation 1110 is a personal computer, but it may also be a laptop computer, a notebook computer, a handheld computer, a palmtop computer, a game console, a mainframe computer, a mini-computer, a micro-computer, a digital computer, an analog computer, an organic computer, an emulator, a thin client, a digital signal processor, or any other suitable workstation, or any combination thereof. In a preferred embodiment administration workstation 1120 is a personal computer, but it may also be a laptop computer, a notebook computer, a handheld computer, a palmtop computer, a game console, a mainframe computer, a mini-computer, a micro-computer, a digital computer, an analog computer, an organic computer, an emulator, a thin client, a digital signal processor, or any other suitable workstation, or any combination thereof. In a preferred embodiment student workstations 1130 are personal computers, but they may also be laptop computers, notebook computers, handheld computers, palmtop computers, game consoles, mainframe computers, mini-computers, micro-computers, digital computers, analog computers, organic computers, emulators, thin clients, digital signal processors, or any other suitable workstation, or any combination thereof. In a preferred embodiment network server 1140 is a personal computer, but it may also be a laptop computer, a notebook computer, a handheld computer, a palmtop computer, a game console, a mainframe computer, a mini-computer, a micro-computer, a digital computer, an analog computer, an organic computer, an emulator, a thin client, a digital signal processor, or any other suitable workstation, or any combination thereof. Memory 1160 is shown to be accessible to network server 1140. In a preferred embodiment memory 1160 is a disk drive, but it may also be a bard drive, a bard disk, a floppy disk, a disk stack, a disk farm, a random access memory, a magnetic tape, a digital tape, a compact disk, a holographic memory, a programmable memory, a static random access memory, a dynamic random access memory, an integrated circuit memory, a flash memory, a magnetic core memory, a tapped delay line, or any other suitable memory device, or any combination thereof. Although memory 1160 is symbolically shown to be attached to network server 1140, memory 1160 could also be attached to teacher workstation 1110, administrator workstation 1120, student workstations 1130, or combinations thereof, as would be known to one of skill in the art. Memory 1160 could also be an integral component of either network server 1140, teacher workstation 1110, administrator workstation 1120 or student workstations 1130, or any combination thereof, as would be known to one of skill in the art. Memory 1160 could also be distributed between network server 1140, teacher workstation 1110, administrator workstation 1120 and student workstations 1130, or any combination thereof, as would be known to one of skill in the art. Administrator output device 1125 is shown to be accessible to administrator workstation 1120. In a preferred embodiment administrator output device 1125 is a cathode ray tube, but it may also be a flat panel display, a liquid crystal display, a teletype, a readout, a monitor, or any other suitable output device, or any combination thereof. Teacher output device 1115 is shown to be accessible to teacher workstation 1110. In a preferred embodiment teacher output device 1115 is a cathode ray tube, but it may also be a flat panel display, a liquid crystal display, a teletype, a readout, a monitor, or any other suitable output device, or any combination thereof. Student output devices 1135 are shown to be accessible to student workstations 1130. In a preferred embodiment student output devices 1135 are cathode ray tubes, but they may also be flat panel displays, liquid crystal displays, teletypes, readouts, monitors, or any other suitable output devices, or any combination thereof.

Figure 12:
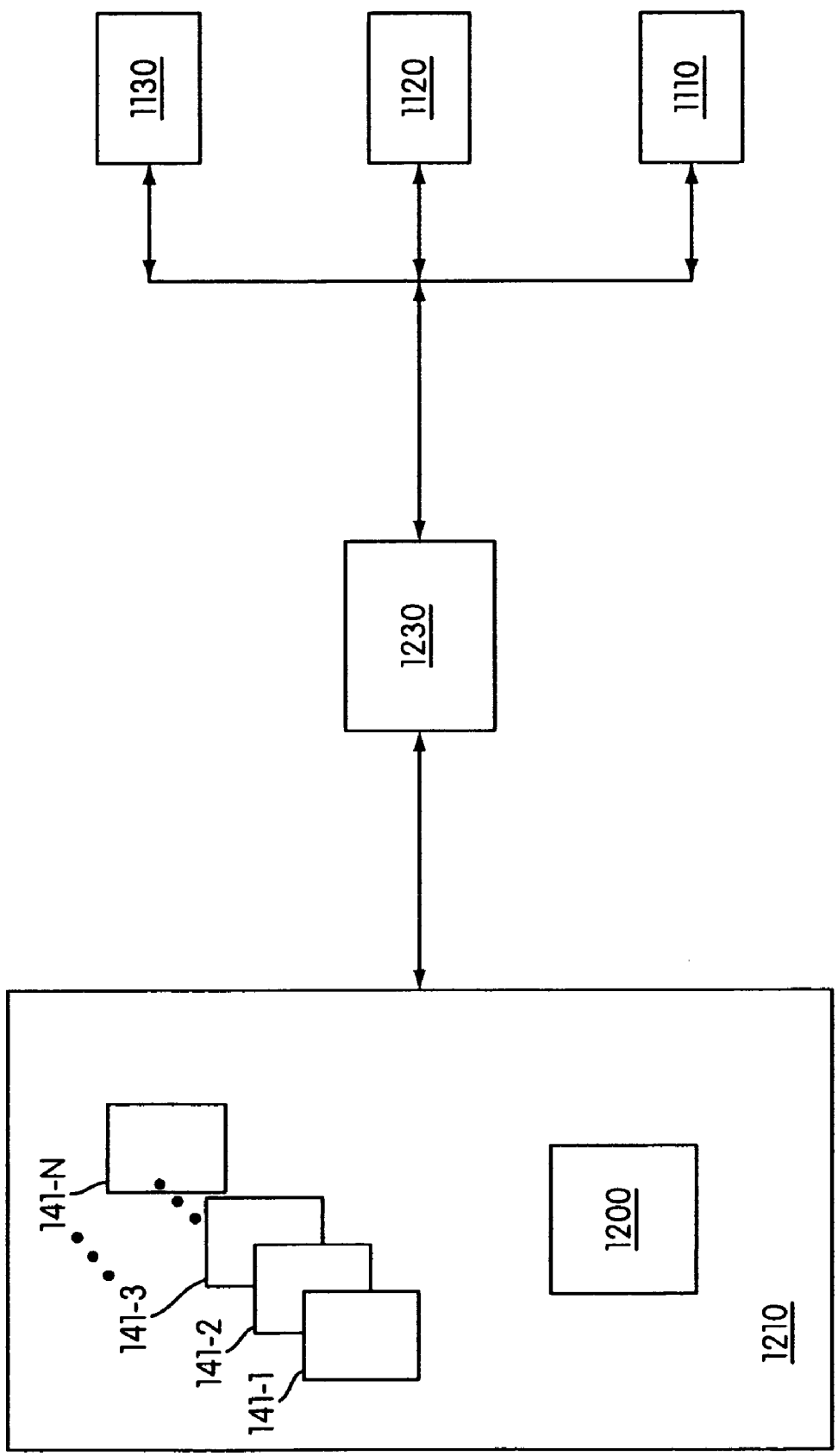
FIG. 12 is a schematic diagram of a system linking an instruction site to a supplier of instructional and assessment materials.

The learning packets 141-1 to 141-N for various subjects and the application software 1200 implementing the algorithms needed to present the learning packets to students in accordance with the present invention are preferably stored at an educational material supplier site 1210 and ordered by users, such as school systems, over the Internet 1230 as shown in FIG. 12. In the case of a school system, for example, an administrator using conventional browser software on a workstation 1120 connected to a distributed network 1240 can view available subjects at the supplier site 1210 via the Internet 1230. The administrator may then order learning packets 141-1 to 141-N for presentation to students. In one embodiment, the application software 1200 is loaded onto the administration workstation 1120 and the learning packets are downloaded from the Internet site 1210 for arrangement and presentation on the workstation using the application software. In another embodiment, the application software 1200 remains resident at the supplier site 1210 and controls presentation of learning packets to student workstations 1130 connected to the Internet 1230 (e.g., via a teacher workstation 1110 and network 1240). While connection via the Internet is shown, it will be appreciated that other types of distributed networks as well as direct dial-up connections between the user and the educational material supplier can be used. In a less preferred embodiment, administration and/or teacher workstations can be provided with learning packets and/or application software installed thereon. In another less preferred embodiment, learning packets and/or application software can be provided to administrators and/or teachers on electronic media such as CD-ROMs, floppy disks, etc. The modular nature of the invention makes it possible to present learning packets prepared by various educational material publishers by defining one or more standard formats that are compatible with the application software. If desired, the system can provide feedback to the educational material publishers on how well their curricula is working, for example by e-mailing the publishers with statistical reports.

As mentioned above, the invention allows the order of presentation of the learning packets to be modified at the option of an administrator or teacher. In a preferred embodiment, the inventive system will suggest a sequence of learning packets for each subject, for example by displaying the available learning packets in a default sequence on a menu. In a further preferred embodiment, the order of presentation of the learning packets can be dynamically reordered manually or automatically within a single training session based on assessment performance. So if, for example, a student repeatedly answers a particular item incorrectly due to lack of mastery of a specific construct, the system can be reordered to present a learning packet related to that specific construct.

In a preferred embodiment, the system includes adaptive testing to automatically determine where an individual student should start in the sequence of learning packets. For example, the system could employ a range-finding algorithm wherein the starting point in the sequence is determined by initially presenting a question of relatively high, low or intermediate difficulty from at least one of the learning packets and then following-up with questions of higher or lower difficulty from at least one of the learning packets depending upon whether the initial question is answered correctly. The system can, for example, begin instruction by presenting a learning packet having a level of difficulty between the most difficult question answered correctly and the least difficult question answered incorrectly.

The invention having been thus described, it will be apparent to those skilled in the art that the same may be varied in many ways without departing from the spirit and scope of the inventions. All such modifications are intended to be encompassed by the following claims.

What is claimed is:

1. A method of modular instruction of a human student for a body of knowledge, the body of knowledge comprising a plurality of cognitive constructs defining component skills to be learned by the student, said method comprising the steps of:
   a) providing a plurality of instructional materials, each of said instructional materials corresponding to at least one cognitive construct;
   b) providing a plurality of post-instruction assessments, each of said post-instruction assessments corresponding to one cognitive construct;
   c) assembling a plurality of learning packets, each of said learning packets corresponding to one cognitive construct and comprising a one of said instructional materials corresponding to the cognitive construct and a one of said post-instruction assessments corresponding to the cognitive construct;
   d) administering one of said learning packets to the student by presenting the instructional material associated with the learning packet to the student and then administering the post-instruction assessment associated with the learning packet to the student;
   e) determining a result of the post-instruction assessment administered to the student;
   f) comparing the result of the post-instruction assessment associated with the learning packet to a predefined benchmark for the learning packet; and
   g) if the result of the post-instruction assessment associated with the learning packet is at least substantially equal to the benchmark for the learning packet, repeating steps d) through f) for another of the learning packets which has not previously been presented to the student.

2. The method of claim 1, wherein the sequence in which the learning packets are presented to a student is aligned with standards relating to expected student competency with respect to the body of knowledge.

3. The method of modular instruction of claim 1, wherein steps d) through f) are repeated until a predetermined number of learning packets have been administered to the student.

4. The method of modular instruction of claim 1, wherein the step of presenting the instructional material associated with the learning packet to the student further comprises the steps of:
   h) providing a plurality of pre-instruction assessments, each of said pre-instruction assessments corresponding to one cognitive construct;
   i) presenting one of the pre-instruction assessments corresponding to the cognitive construct associated with the learning packet to the student;
   j) comparing a result of the pre-instruction assessment to the benchmark for the learning packet; and
   k) skipping the instructional material and the post-instruction assessment associated with the learning packet if the result of the pre-instruction assessment is at least substantially equal to the benchmark for the learning packet.

5. The method of modular instruction of claim 1, wherein if the result of the post-instruction assessment of the instructional material associated with the learning packet is not at least substantially equal to the benchmark for the learning packet, presenting the instructional material associated with the learning packet to the student further comprises the steps of:
   h) re-presenting the instructional material associated with the learning packet;
   i) re-administering the post-instruction assessment associated with the learning packet;
   j) computing a difference between a result of the post-instruction assessment associated with the learning packet taken after the instructional material associated with the learning packet is re-presented and a result of the post-instruction assessment associated with the learning packet taken before the instructional material associated with the learning packet is re-presented; and
   k) intervening in the presentation of the instructional material if the difference is negative or substantially equal to zero.

6. The method of modular instruction of claim 1, wherein said instructional material is embodied in a medium selected from the group consisting of a) a book, b) a video, c) a slide, d) a recording, e) a program, f) an interactive presentation, g) a film, h) a movie, i) a photograph, j) an experiment, k) a field trip, l) a lecture, m) an E-mail, n) a demonstration, o) a game, and p) a text file.

7. The method of modular instruction of claim 1, wherein said result of the post-instruction assessment is selected from the group consisting of: a) an average, b) a mean, c) a median, d) a quartile, e) a percentage, f) a score, g) an indication, and h) a grade.

8. The method of modular instruction of claim 5, wherein said intervening step is selected from the group consisting of: a) replacing the instructional material, b) sub-dividing the instructional material, c) slowing down the presentation of the instructional material, and d) performing a needs assessment.

9. A modular instruction system comprising:
storage means;
a plurality of learning packets stored in said storage means in a default sequence, each of said learning packets comprising:
  instructional materials configured to be presented to a human student in format that is perceivable by the human student and associated with one of a plurality of cognitive constructs comprising a body of knowledge; and
  a post-instruction assessment configured to be presented to a human student in format that is perceivable by the human student and associated with the one cognitive construct; and
administration means in communication with said storage means for administering at least a portion of the plurality of learning packets, one at a time, to a human student by presenting instructional materials associated with one of said learning packets to the student and thereafter administering the post-instruction assessment associated with the learning packet to the student wherein the sequence in which the learning packets are presented to a student is aligned with standards relating to expected student competency with respect to the body of knowledge.

10. The modular instruction system of claim 9, further comprising a sequence selection module constructed and arranged to enable a user to order said plurality of learning packets in a sequence that differs from the default sequence.

11. The modular instruction system of claim 9, further comprising an adaptive testing module constructed and arranged to automatically determine where an individual student should start in a sequence of the plurality of learning packets.

12. The modular instruction system of claim 9, further comprising a plurality of pre-instruction assessments stored in said storage means, one of said pre-instruction assessments associated with each of the cognitive constructs.

13. The modular instruction system of claim 9, further comprising a presentation device adapted to present at least one of instructional materials and post-instruction assessments to a student.

14. A method of providing modular instruction of a body of knowledge divisible into plural cognitive constructs using a plurality of learning packets in which each learning packet includes at least one instructional material, at least one post-instruction assessment, and at least one benchmark corresponding to a single cognitive construct, said method comprising the steps of:
a) receiving an order for k learning packets for a given body of knowledge in a sequence j from 1 through k, wherein k is less than or equal to the total number of learning packets available for the given body of knowledge;
b) delivering the ordered learning packets in an electronic format;
c) providing computer-executable instructions adapted to configure a computer executing the instructions to:
  1) electronically transmit the instructional material associated with a jth learning packet to a workstation for presentation to a human student in a human-perceivable format;
  2) electronically transmitting the post-instruction assessment associated with the jth learning packet to the workstation for presentation to the student in a human-perceivable format;
  3) compare a result of the post-instruction assessment associated with the jth learning packet to a benchmark for the jth learning packet; and
  4) repeating steps 1) through 4) using the next learning packet in the sequence if the result of the post-instruction assessment for the previous learning packet is found to be at least substantially equal to the benchmark for the previous learning packet in step 3).

15. The method of modular instruction of claim 14, wherein step b) includes delivering the learning packets over the Internet.

16. The method of modular instruction of claim 15, further comprising displaying the learning packets in a suggested sequence on a website and enabling a user to rearrange the sequence of learning packets from the suggested sequence.

17. A method of modular instruction for a body of knowledge, the body of knowledge comprising a plurality of cognitive constructs defining component skills to be learned by a human student, said method comprising the steps of:
a) providing a plurality of instructional materials in electronic format, each of said instructional materials corresponding to at least one cognitive construct, said instructional materials being configured to be presented with a presentation device in a manner that is perceivable by a human student;
b) providing a plurality of post-instruction assessments in electronic format, each of said post-instruction assessments corresponding to at least one cognitive construct, said post instruction assessments being configured to be presented with a presentation device in a manner that is perceivable by a human student;
c) associating at least one of said plurality of instructional materials and one of said plurality of post-instruction assessments with each of the cognitive constructs, wherein each said association of an instructional material and a post-instruction assessment with a cognitive construct comprises a learning packet;
d) receiving an order for k learning packets for a given body of knowledge in a sequence j from 1 through k, wherein k is less than or equal to the total number of learning packets available for the given body of knowledge; and
e) transmitting the learning packets in an electronic format in response to the order received in step d).

18. The method of modular instruction of claim 17, wherein step e) includes transmitting the learning packets over the Internet.

19. The method of modular instruction of claim 17, further comprising the step of f) displaying the learning packets corresponding to a body of knowledge in a sequence on a website accessible via the Internet.

20. The method of modular instruction of claim 17, further comprising the step of g) providing software that allows a recipient of the learning packets transmitted in step e) to freely modify the sequence in which the learning packets are presented to a student.

* * * * *